US009617495B2

(12) United States Patent
Ghahary et al.

(10) Patent No.: US 9,617,495 B2
(45) Date of Patent: Apr. 11, 2017

(54) TRANSMISSION LUBRICANT

(75) Inventors: Reza Ghahary, Darmstadt (DE); Juergen Gebhardt, Schaafheim (DE); Thilo Krapfl, Singapore (SG); Michael Mueller, Bensheim (DE); Thomas Schimmel, Darmstadt (DE); Roland Schweder, Darmstadt (DE); Torsten Stoehr, Frankfurt (DE); Christoph Wincierz, Darmstadt (DE)

(73) Assignee: Evonik Oil Additives GmbH, Darmstadt (DE)

( * ) Notice: Subject to any disclaimer, the term of this patent is extended or adjusted under 35 U.S.C. 154(b) by 261 days.

(21) Appl. No.: 13/636,034

(22) PCT Filed: Feb. 24, 2011

(86) PCT No.: PCT/EP2011/052712
§ 371 (c)(1),
(2), (4) Date: Sep. 19, 2012

(87) PCT Pub. No.: WO2011/134695
PCT Pub. Date: Nov. 3, 2011

(65) Prior Publication Data
US 2013/0229016 A1 Sep. 5, 2013

(30) Foreign Application Priority Data

Apr. 26, 2010 (DE) ........................ 10 2010 028 195

(51) Int. Cl.
*C10M 145/14* (2006.01)
*C08F 220/18* (2006.01)
*C10M 107/28* (2006.01)
*F03D 9/00* (2016.01)
*F03D 80/70* (2016.01)
*C08F 2/38* (2006.01)

(52) U.S. Cl.
CPC ......... *C10M 145/14* (2013.01); *C08F 220/18* (2013.01); *C10M 107/28* (2013.01); *F03D 9/002* (2013.01); *F03D 80/70* (2016.05); *C08F 2/38* (2013.01); *C08F 2220/1891* (2013.01); *C10M 2203/102* (2013.01); *C10M 2205/0285* (2013.01); *C10M 2209/0845* (2013.01); *C10N 2220/021* (2013.01); *C10N 2220/022* (2013.01); *C10N 2230/02* (2013.01); *C10N 2230/06* (2013.01); *C10N 2230/08* (2013.01); *C10N 2230/36* (2013.01); *C10N 2240/04* (2013.01)

(58) Field of Classification Search
USPC .................................................. 508/469, 473
See application file for complete search history.

(56) References Cited

U.S. PATENT DOCUMENTS

| | | | |
|---|---|---|---|
| 4,822,508 A | 4/1989 | Pennewiss et al. | |
| 5,070,131 A | 12/1991 | Rhodes et al. | |
| 6,124,249 A * | 9/2000 | Seebauer | C08F 220/18 508/469 |
| 6,271,184 B1 | 8/2001 | Seebauer et al. | |
| 7,560,420 B2 * | 7/2009 | Kinker et al. | 508/470 |
| 7,648,950 B2 * | 1/2010 | Placek | C10M 145/14 508/466 |
| 7,981,848 B2 * | 7/2011 | Placek et al. | 508/466 |
| 8,101,559 B2 * | 1/2012 | Mueller | C08F 220/36 508/469 |
| 8,143,202 B2 * | 3/2012 | Peer | C08F 220/18 508/469 |
| 8,163,682 B2 * | 4/2012 | Stoehr et al. | 508/469 |
| 8,722,601 B2 * | 5/2014 | Mueller et al. | 508/469 |
| 8,754,018 B2 * | 6/2014 | Scherer et al. | 508/469 |
| 9,175,242 B2 * | 11/2015 | Radano | C10M 161/00 |
| 2004/0092409 A1 * | 5/2004 | Liesen | 508/469 |
| 2006/0240999 A1 | 10/2006 | Placek et al. | |
| 2006/0252660 A1 * | 11/2006 | Duggal | C08F 220/18 508/459 |
| 2007/0066495 A1 | 3/2007 | Macpherson | |
| 2008/0096778 A1 | 4/2008 | Breon et al. | |
| 2008/0132663 A1 * | 6/2008 | Acker | C08F 2/00 526/227 |
| 2008/0146475 A1 * | 6/2008 | Mueller | C08F 220/36 508/469 |
| 2008/0221271 A1 * | 9/2008 | Duggal | C08F 20/68 525/191 |
| 2009/0118150 A1 | 5/2009 | Baum et al. | |
| 2009/0143262 A1 | 6/2009 | Kawata | |
| 2009/0186787 A1 | 7/2009 | Scherer et al. | |
| 2010/0144569 A1 | 6/2010 | Placek et al. | |
| 2010/0212624 A1 | 8/2010 | Breon et al. | |
| 2012/0053100 A1 * | 3/2012 | Radano et al. | 508/474 |
| 2012/0065109 A1 * | 3/2012 | Matsuoka | C10M 145/14 508/287 |
| 2012/0135902 A1 * | 5/2012 | Baum | C10M 145/14 508/464 |
| 2012/0172268 A1 * | 7/2012 | Shirahama et al. | 508/469 |
| 2012/0302477 A1 * | 11/2012 | Langston et al. | 508/469 |

FOREIGN PATENT DOCUMENTS

| | | |
|---|---|---|
| DE | 699 19 611 | 9/2005 |
| DE | 10 2006 027 602 | 12/2007 |

(Continued)

OTHER PUBLICATIONS

U.S. Appl. No. 13/576,098, filed Jul. 30, 2012, Langston et al.

(Continued)

*Primary Examiner* — Ellen McAvoy

(74) *Attorney, Agent, or Firm* — Oblon, McClelland, Maier & Neustadt, L.L.P.

(57) ABSTRACT

The present invention relates to a transmission lubricant comprising at least 30% by weight of polyalkyl (meth) acrylate. The present invention further describes polyalkyl (meth)acrylates for use in lubricants and also processes for preparing them and their use. The present lubricants can be used particularly in wind turbine transmissions.

26 Claims, No Drawings

(56) References Cited

FOREIGN PATENT DOCUMENTS

| | | |
|---|---|---|
| EP | 0 225 598 | 6/1987 |
| EP | 1 777 286 | 4/2007 |
| EP | 1 876 220 | 1/2008 |
| FR | 2 701 036 | 8/1994 |
| JP | 2003-147332 A | 5/2003 |
| RU | 2 041 923 C1 | 8/1995 |
| WO | 2006 047393 | 5/2006 |
| WO | 2006 068866 | 6/2006 |
| WO | 2006 111211 | 10/2006 |
| WO | WO 2007/145924 A1 | 12/2007 |
| WO | WO 2010/038147 A1 | 4/2010 |
| WO | WO 2012/076285 A1 | 6/2012 |
| WO | WO 2012/076676 A1 | 6/2012 |

OTHER PUBLICATIONS

International Search Report Issued Jun. 16, 2011 in PCT/EP11/52712 Filed Feb. 24, 2011.

Office Action issued Sep. 8, 2014 in Japanese Patent Application No. 2013-506553 (with English language translation).

Russian Certificate of Grant issued Jun. 30, 2015 in Patent Application No. 2012150070/04 (080132) (with English language translation).

English Translation of Office Action dated Jan. 15, 2015 issued in Russian Patent Application No. 2012150070/04 (080132), filed Feb. 24, 2011.

\* cited by examiner

TRANSMISSION LUBRICANT

The present invention relates to lubricants for transmission systems and wind power plants wherein the transmission system comprises a lubricant containing polyalkyl (meth)acrylates. In addition, the present invention describes polyalkyl(meth)acrylates and processes for preparation thereof and use thereof as lubricants in transmission systems.

Decreasing global mineral oil reserves and discussions about a rising carbon dioxide content in the earth's atmosphere are causing increasing interest in alternative energies. More particularly, systems for utilization of wind energy are gaining increasing importance.

These systems comprise, as well as further components, particularly transmission systems, which are subject to extreme stress. For instance, not only are extremely high, highly varying torques transmitted, but these systems are also subject to significant temperature changes. Furthermore, these systems and hence the transmission systems present therein should have a low maintenance requirement, since the economic viability thereof would otherwise be greatly impaired or they would be unviable.

Due to this profile of requirements, transmission systems for wind power plants differ very greatly from other transmission systems which are used in plant and vehicle construction. These differences are manifested particularly in the lubricants too, which are used for these transmission systems.

While automobiles typically in—based on operating performance—have relatively short oil change intervals, which can be conducted in a standard manner in any workshop, oil changes for wind power plants are associated with a high level of cost, time and material, since the oil has to be conveyed from the base to the pod, and the used oil has to leave the pod in the reverse direction. Moreover, the amount of oil is large and is up to 1500 liters according to the plant size. An additional factor is that the oil change leads to an interruption in power generation. In addition, it should be ensured that a transmission system does not fail since exchange thereof at a great height above the surface of the earth is very expensive, and a replacement is often available only after long wait times or laborious repair. For these reasons, high-performance transmission oils used preferentially for wind power plants are those which retain their function over a long period and can be used over a large temperature range. In addition, the power loss caused by the transmission oil should be at a minimum.

Other industrial transmission systems likewise profit from transmission oils with long lifetime, even in the cases in which the oil change is less inconvenient per se, or the stresses are typically more homogeneous than in wind power plants. The advantage of lower shutdown times and of better protection for the transmission system, and also of the costs for the oil change owing to the high amount of transmission oil, also applies in industrial transmission applications outside wind power.

For these reasons, it is customary to operate transmission systems for wind power plants using lubricants based on specific polyalphaolefins (PAOs). Such lubricants are detailed, for example, in WO 2007/145924 A1. These lubricants generally comprise two base oils of different viscosity.

The known lubricants have a useable profile of properties. However, the provision of a lubricant with an improved profile of properties is a constant task.

In view of the prior art, it is thus an object of the present invention to provide a lubricant for transmission systems with an improved profile of properties.

For example, the lubricant should have an improved seal compatibility, more particularly compared to polyalphaolefins. In addition, the lubricant should exhibit improved flow characteristics at low temperatures. Furthermore, the lubricant should have an enhanced viscosity index without any associated decrease in the service life of the lubricant.

Especially the lubricants detailed in WO 2007/145924 A1 comprise relatively large amounts of expensive PAOs, the preparation of which is complex and which have a high viscosity. The second base component of the lubricants described is a PAO grade with a lower viscosity and is much less expensive. It is therefore a particular task to substitute the amount or grade of the relatively more expensive component with less expensive alternatives.

In addition, the wear and fatigue of the transmission systems should be minimized as far as possible by the lubricant. At the same time, the lubricant should minimize the power loss, i.e. lead to a low coefficient of friction, in order to increase the efficiency of the plant.

Furthermore, the lubricant should be compatible with many additives, although, to improve compatibility, if possible, only minor additives, and ideally no additional additives, should be necessary since they are associated with further costs.

These objects, and further objects which are not stated explicitly but are immediately derivable or discernible from the connections discussed herein by way of introduction, are achieved by a lubricant for a transmission system having the features described above. Appropriate modifications of the inventive lubricants are described herein.

The present invention accordingly provides a lubricant for a transmission system, which is characterized in that it comprises at least 30% by weight of polyalkyl(meth)acrylate.

The present invention further provides a polyalkyl(meth) acrylate for use in lubricants, comprising a) 0 to 25% by weight of repeat units derived from (meth) acrylates of the formula (I)

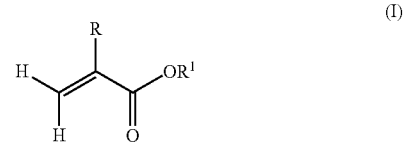

in which R is hydrogen or methyl and $R^1$ is an alkyl radical having 1 to 5 carbon atoms, b) 50 to 100% by weight of repeat units derived from (meth)acrylates of the formula (II)

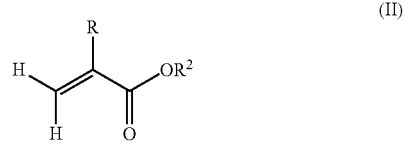

in which R is hydrogen or methyl and $R^2$ is an alkyl radical having 6 to 15 carbon atoms, and c) 0 to 50% by weight of repeat units derived from (meth)acrylates of the formula (III)

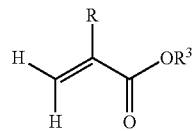

in which R is hydrogen or methyl and $R^3$ is an alkyl radical having 16 to 40 carbon atoms, which is characterized in that the polyalkyl(meth)acrylate has a weight-average molecular weight in the range from 3000 to 25 000 g/mol and a polydispersity in the range from 1.1 to 2.5, and the repeat units of the formula (II) are a mixture of linear and branched radicals where 5 to 80% of the $R^2$ radicals are branched, based on the weight of the repeat units of the formula (II).

It is thus possible in an unforeseeable manner to provide a lubricant for a transmission system with an improved profile of properties.

For example, the lubricant exhibits improved seal compatibility, more particularly compared to polyalphaolefins. In addition, the lubricant has improved flow characteristics at low temperatures. Furthermore, the lubricant has an enhanced viscosity index without any associated decrease in the service life of the lubricant. More particularly, the shear stability is excellent, and the outstanding rheological properties of the lubricant should be taken into account.

Furthermore, the lubricant can be provided relatively inexpensively. At the same time, the amount of relatively inexpensive components, particularly of low-viscosity base oils, can be kept high without any unacceptable impairment of the further properties, particularly the shear stability, the low-temperature flowability or the viscosity index.

Moreover, the lubricant can be produced from inexpensive base materials on the industrial scale without any associated investments in expensive plants or danger to the environment.

In addition, wear and fatigue of the transmission systems can be greatly minimized by the lubricant. A distinction is typically drawn between two groups of faults at metallic surfaces of transmission systems, especially at gearings and roller bearings:
1. Wear resulting from continuous surface material removal or scuffing as a result of abrupt material removal after surface wear of both friction partners.
2. Fatigue which becomes visible through gray staining (surface fatigue, micro-pitting) or craters (sub-surface fatigue, pitting). This damage is caused by material flaking off or breaking out owing to cracks, which are caused 20-40 μm or 100-500 μm below the surface by shear stresses in the metal lattice.

The types of damage mentioned are commonly known for gearings and roller bearings, and are described in detail, for example, in the publications "Gears—Wear and Damage to Gear Teeth", ISO DIN 10825 and "Wällzlagerschäden" [Damage to roller bearings], Publ. No. WL 82 102/2 DA from FAG (Schaeffler KG), Schweinfurt 2004.

Furthermore, the low coefficient of friction of the inventive lubricant can keep the power loss of the transmission system extremely low.

Moreover, the lubricant is compatible with many additives, and barely any, if any, additives are needed to improve compatibility.

Surprisingly, a polyalkyl(meth)acrylate particularly preferred for achievement of the properties detailed above can be prepared very inexpensively, the preparation being possible preferentially without the use of particular solvents and within a relatively short time.

The present invention describes a lubricant for a transmission system. Lubricants, especially lubricant oils, serve to reduce friction and wear, and for force transmission, cooling, vibration damping, sealing action and corrosion protection. In this context, transmission oils are typically distinguished from other lubricant oils, which can serve, for example, for lubrication of engines. Typically, these differences are manifested particularly in the additives added, and transmission oils in many cases have higher proportions of antiwear and extreme pressure additives compared to motor oils.

The inventive lubricant comprises at least 30% by weight, preferably at least 40% by weight and more preferably at least 45% by weight of polyalkyl(meth)acrylates.

Polyalkyl(meth)acrylates are polymers by which polymerization of alkyl(meth)acrylates can be obtained. The expression "(meth)acrylates" encompasses methacrylates and acrylates and mixtures of the two. These monomers are widely known.

Polyalkyl(meth)acrylates comprise preferably at least 40% by weight, more preferably at least 60% by weight, especially preferably at least 80% by weight and most preferably at least 90% by weight of repeat units derived from alkyl(meth)acrylates.

Polyalkyl(meth)acrylates of particular interest include those which preferably have a weight-average molecular weight $M_w$ in the range from 3000 to 25 000 g/mol, preferably 5000 to 20 000 g/mol, more preferably 10 000 to 18 000 g/mol and most preferably 13 000 to 15 000 g/mol.

The number-average molecular weight $M_n$ may preferably be in the range from 2500 to 20 000 g/mol, more preferably 5000 to 17 500 g/mol and most preferably 7000 to 13 000 g/mol.

Further appropriate polyalkyl(meth)acrylates are those whose polydispersity index $M_w/M_n$ is in the range from 1.1 to 2.5, more preferably in the range from 1.4 to 1.9 and most preferably in the range from 1.5 to 1.8. The number-average and weight-average molecular weights can be determined by known processes, for example gel permeation chromatography (GPC), preferably using a PMMA standard.

Preferred polyalkyl(meth)acrylates comprise
a) 0 to 25% by weight, especially up to 20% by weight and more preferably up to 15% by weight of repeat units derived from (meth)acrylates of the formula (I)

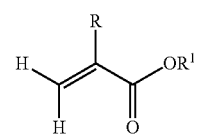

in which R is hydrogen or methyl and $R^1$ is an alkyl radical having 1 to 5 carbon atoms,
b) 50 to 100% by weight, especially at least 70% by weight and more preferably at least 80% by weight of repeat units derived from (meth)acrylates of the formula (II)

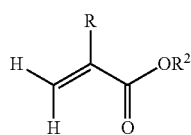

(II)

in which R is hydrogen or methyl and $R^2$ is an alkyl radical having 6 to 15 carbon atoms, and c) 0 to 50% by weight, preferably up to 30% by weight and more preferably up to 20% by weight of repeat units derived from (meth)acrylates of the formula (III)

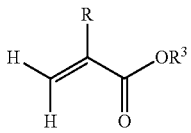

(III)

in which R is hydrogen or methyl and $R^3$ is an alkyl radical having 16 to 40 carbon atoms.

In a particular embodiment, an inventive polyalkyl(meth)acrylate may preferably at least 0.1% by weight and more preferably at least 0.5% by weight of repeat units derived from (meth)acrylates of the formula (I).

In a particular embodiment, an inventive polyalkyl(meth)acrylate may comprise at least preferably 0.1% by weight and more preferably at least 1% by weight of repeat units derived from (meth)acrylates of the formula (III).

The polyalkyl(meth)acrylates can preferably be obtained by free-radical polymerization. Accordingly, the proportion by weight of the respective repeat units that these polymers have is calculated from the proportions by weight of corresponding monomers used for preparation of the polymers.

Examples of (meth)acrylates of the formula (I) include linear and branched (meth)acrylates which derive from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate; and cycloalkyl (meth)acrylates such as cyclopentyl (meth)acrylate.

The (meth)acrylates of the formula (II) include especially linear and branched (meth)acrylates which derive from saturated alcohols, such as hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate; (meth)acrylates which derive from unsaturated alcohols, for example oleyl (meth)acrylate; cycloalkyl (meth)acrylates such as cyclohexyl (meth)acrylate, 3-vinylcyclohexyl (meth)acrylate, bornyl (meth)acrylate.

Examples of monomers of the formula (III) include linear and branched (meth)acrylates which derive from saturated alcohols, such as hexadecyl (meth)acrylate, 2-methylhexadecyl (meth)acrylate, 2-methylpentadecyl (meth)acrylate, 2-ethyltetradecyl (meth)acrylate, 2-propyltridecyl (meth)acrylate, 2-butyldodecyl (meth)acrylate, 2-methylhexadecyl (meth)acrylate, 2-pentyldodecyl (meth)acrylate, 2-hexyldecyl (meth)acrylate, 2-hexylundecyl (meth)acrylate, n-heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate; cycloalkyl (meth)acrylates such as 2,4,5-tri-t-butyl-3-vinylcyclohexyl (meth)acrylate, 2,3,4,5-tetra-t-butylcyclohexyl (meth)acrylate.

Alkyl (meth)acrylates with a long-chain alcohol radical, especially components (II) and (III), can be obtained, for example, by reacting (meth)acrylates and/or the corresponding acids with long-chain fatty alcohols, generally forming a mixture of esters, for example (meth)acrylates with various long-chain alcohol radicals. These fatty alcohols include Oxo Alcohol® 7911, Oxo Alcohol® 7900, Oxo Alcohol® 1100; Alfol® 610, Alfol® 810, Lial® 125 and Nafol® products (Sasol); C13-C15-Alkohol (BASF); Epal® 610 and Epal® 810 (Afton); Linevol® 79, Linevol® 911 and Neodol® 25 (Shell); Dehydad®, Hydrenol® and Lorol® products (Cognis); Acropol® 35 and Exxal® 10 (Exxon Chemicals); Kalcol® 2465 (Kao Chemicals).

The weight ratio of alkyl (meth)acrylates of the formula (III) to the (meth)acrylates of the formula (II) may be within a wide range. The weight ratio of monomers of the formula (III) having 16 to 40 carbon atoms in the alcohol radical to the monomers of the formula (II) having 6 to 15 carbon atoms in the alcohol radical is preferably less than 5:1, especially less than 1:1, more preferably less than 1:5 and more preferably less than 1:10. In a particular aspect of the present invention, the weight ratio of monomers of the formula (III) having 16 to 40 carbon atoms in the alcohol radical to the monomers of the formula (II) having 6 to 15 carbon atoms in the alcohol radical may be less than 1:100, and, in preferred embodiments, the polymer does not comprise any monomers of the formula (III) having 16 to 40 carbon atoms in the alcohol radical.

Surprising advantages can be achieved especially with polyalkyl(meth)acrylate for use in lubricants which have a weight-average molecular weight in the range from 3000 to 25 000 g/mol and a polydispersity in the range from 1.1 to 2.5. A further feature of these polyalkyl(meth)acrylates is that the repeat units of the formula (II) are a mixture of linear and branched radicals where 5 to 80%, preferably 10 to 65%, of the $R^2$ radicals are branched, based on the weight of the repeat units of the formula (II).

Particularly advantageously, it is especially possible to use polyalkyl(meth)acrylates wherein the units derived from repeat units of the formula (II) are a mixture of linear and branched radicals where the proportion by weight of the branched $R^2$ radicals having 9 to 11 carbon atoms is higher than the proportion by weight of the linear $R^2$ radicals having 9 to 11 carbon atoms.

Polyalkyl(meth)acrylates of further interest include those wherein the repeat units of the formula (II) are a mixture of linear and branched radicals where the proportion by weight of the linear $R^2$ radicals having 12 to 15 carbon atoms is preferably higher than the proportion by weight of the branched $R^2$ radicals having 12 to 15 carbon atoms.

In addition, surprising advantages can be achieved by polyalkyl(meth)acrylates which are characterized in that the repeat units of the formula (II) are a mixture of branched and linear radicals where the weight ratio of branched to linear $R^2$ radicals is in the range from 60:40 to 20:80.

In a further embodiment, preference is given to lubricants comprising polyalkyl(meth)acrylates wherein the repeat units of the formula (II) have a high proportion of branched $R^2$ radicals having 10 to 15 carbon atoms. The ratio of branched to linear $R^2$ radicals may more preferably be in the range from 70:30 to 50:50, preferably 60:40 to 65:35, the repeat units of the formula (II) having at least 50% by weight and preferably at least 70% by weight of $R^2$ radicals having 13 to 15 carbon atoms, based on the proportion of repeat units of the formula (II).

In addition, particular preference is given to polyalkyl (meth)acrylates wherein the repeat units of the formula (II) are a mixture of $R^2$ radicals with a different number of carbon atoms, the proportion by weight of $R^2$ radicals having 12 to 15 carbon atoms being greater than the proportion by weight of $R^2$ radicals having 7 to 11 carbon atoms.

The proportions of repeat units of the formula (II) with the respective carbon numbers and the isomerism thereof can be determined by customary processes with reference to the monomers which are used for preparation of the polymers. These include particularly gas chromatography (GC).

In addition, it is possible with preference to use polyalkyl (meth)acrylates having repeat units of the formula (II) where at least 50% by weight, especially 70% by weight and more preferably 90% by weight of the repeat units of the formula (II) having a branched $R^2$ radical have at least one branch at one of positions 2 to 5, preferably at position 2, based on the weight of the repeat units of the formula (II) having a branched $R^2$ radical.

The alkyl (meth)acrylates of the polyalkyl(meth)acrylates of the present invention may, in this context, have a short-chain or long-chain branch. In a particular aspect of the present invention, preference is given to using polyalkyl (meth)acrylates whose repeat units of the formula (II) are a mixture of branched radicals, the mixture comprising repeat units with methyl branches and with ethyl branches. In addition, it is also possible to use polyalkyl(meth)acrylates whose repeat units of the formula (II) are a mixture of branched radicals, the mixture comprising repeat units with propyl branches and with longer-chain branches, especially butyl or pentyl branches. Particular preference is given here especially to polyalkyl(meth)acrylates which contain both methyl, ethyl, propyl branches and longer-chain branches in the repeat units of the formula (II).

The type of branch and the position of the branch can be measured by means of NMR processes with reference to the monomers which are used for preparation of the polymers. It is possible here to conduct and evaluate especially $^{13}C$ and $^1H$ NMR measurements. Valuable pointers can be found especially in "Determination of the Oligomer Distribution in Ethoxylated Linear and Branched Alkanols using $^{13}C$-NMR", Li Yang et al. Eur. Polym. J. Vol. 33 (2), 143 (1997) and "Quantitative assessment of Alkyl Chain Branching in Alcohol-Based Surfactants by Nuclear Magnetic Resonance", J. Duynhoven, A. Leika and P. C. van der Hoeven, J. of Surfactants and Detergents Vol 8 (1), 73 (2005). For clarification, it should be pointed out that butyl branches cannot be distinguished from pentyl or hexyl branches by means of the NMR methods detailed, and so the term "longer-chain branch" includes not only the butyl branches but also pentyl or hexyl branches.

In addition, the monomer mixture for preparation of the polyalkyl(meth)acrylates for use in accordance with the invention may comprise monomers copolymerizable with the (meth)acrylates of the formulae (I), (II) and/or (III). These include
aryl (meth)acrylates such as benzyl methacrylate or phenyl methacrylate, where the aryl radicals may in each case be unsubstituted or up to tetrasubstituted; styrene, substituted styrenes having an alkyl substituent in the side chain, for example □-methylstyrene and □-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes;
maleic acid and maleic acid derivatives, for example maleic monoesters, maleic diesters, maleic anhydride, methylmaleic anhydride, maleimide, methylmaleimide;
itaconic acid and itaconic acid derivatives, for example itaconic monoesters, itaconic diesters and itaconic anhydride;
fumaric acid and fumaric acid derivatives, for example fumaric monoesters, fumaric diesters and fumaric anhydride; 1-alkenes, especially 1-butene, 1-pentene, 1-hexene, 1-heptene, 1-octene, 1-nonene, 1-decene, 1-undecene, 1-dodecene, 1-tridecene, 1-tetradecene and 1-pentadecene.

In a particular embodiment, it is especially possible to use dispersing monomers.

Dispersing monomers have long been used for functionalization of polymeric additives in lubricant oils and are therefore known to those skilled in the art (cf. R. M. Mortier, S. T. Orszulik (eds.): "Chemistry and Technology of Lubricants", Blackie Academic & Professional, London, $2^{nd}$ ed. 1997). It is appropriately possible to use particularly heterocyclic vinyl compounds and/or ethylenically unsaturated, polar ester or amide compounds of the formula (IV)

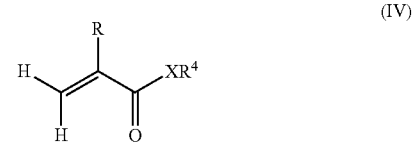

in which R is hydrogen or methyl, X is oxygen, sulfur or an amino group of the formula —NH— or —$NR^a$—, in which $R^a$ is an alkyl radical having 1 to 10 and preferably 1 to 4 carbon atoms, $R^4$ is a radical which comprises 2 to 50, especially 2 to 30 and preferably 2 to 20 carbon atoms and has at least one heteroatom, preferably at least two heteroatoms, as dispersing monomers.

Examples of dispersing monomers of the formula (IV) include aminoalkyl (meth)acrylates, aminoalkyl (meth)acrylamides, hydroxylalkyl (meth)acrylates, heterocyclic (meth) acrylates and/or carbonyl-containing (meth)acrylates.

The hydroxyalkyl (meth)acrylates include
2-hydroxypropyl (meth)acrylate,
3,4-dihydroxybutyl (meth)acrylate,
2-hydroxyethyl (meth)acrylate,
3-hydroxypropyl (meth)acrylate,
2,5-dimethyl-1,6-hexanediol (meth)acrylate and
1,10-decanediol (meth)acrylate.

Carbonyl-containing (meth)acrylates comprise, for example,
2-carboxyethyl (meth)acrylate,
carboxymethyl (meth)acrylate,
N-(methacryloyloxy)formamide,
acetonyl (meth)acrylate,
mono-2-(meth)acryloyloxyethyl succinate, N-(meth)acryloylmorpholine,
N-(meth)acryloyl-2-pyrrolidinone,
N-(2-(meth)acryloyloxyethyl)-2-pyrrolidinone,
N-(3-(meth)acryloyloxypropyl)-2-pyrrolidinone,
N-(2-(meth)acryloyloxypentadecyl)-2-pyrrolidinone,
N-(3-(meth)acryloyloxyheptadecyl)-2-pyrrolidinone and
N-(2-(meth)acryloyloxyethyl)ethyleneurea.
2-acetoacetoxyethyl (meth)acrylate The heterocyclic (meth)acrylates include 2-(1-imidazolyl)ethyl (meth)acrylate,
oxazolidinylethyl (meth)acrylate,
2-(4-morpholinyl)ethyl (meth)acrylate,
1-(2-methacryloyloxyethyl)-2-pyrrolidone,
N-methacryloylmorpholine,
N-methacryloyl-2-pyrrolidinone,
N-(2-methacryloyloxyethyl)-2-pyrrolidinone,
N-(3-methacryloyloxypropyl)-2-pyrrolidinone.

The aminoalkyl (meth)acrylates include especially
N,N-dimethylaminoethyl (meth)acrylate,
N,N-dimethylaminopropyl (meth)acrylate,
N,N-diethylaminopentyl (meth)acrylate,
N,N-dibutylaminohexadecyl (meth)acrylate.

In addition, it is possible to use aminoalkyl (meth)acrylamides as dispersing monomers, such as N,N-dimethylaminopropyl(meth)acrylamide.

In addition, it is possible to use phosphorus-, boron- and/or silicon-containing (meth)acrylates as dispersing monomers, such as
2-(dimethylphosphato)propyl (meth)acrylate,
2-(ethylenephosphito)propyl (meth)acrylate,
dimethylphosphinomethyl (meth)acrylate,
dimethylphosphonoethyl (meth)acrylate,
diethyl (meth)acryloylphosphonate,
dipropyl (meth)acryloylphosphate,
2-(dibutylphosphono)ethyl (meth)acrylate,
2,3-butylene(meth)acryloylethyl borate,
methyldiethoxy(meth)acryloylethoxysilane,
diethylphosphatoethyl (meth)acrylate.

The preferred heterocyclic vinyl compounds include 2-vinylpyridine, 3-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, N-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles.

The particularly preferred dispersing monomers include especially ethylenically unsaturated compounds comprising at least one nitrogen atom, these being selected with particular preference from the above-detailed heterocyclic vinyl compounds and/or aminoalkyl (meth)acrylates, aminoalkyl (meth)acrylamides and/or heterocyclic (meth)acrylates.

The proportion of comonomers can be varied according to the end use and profile of properties of the polymer. In general, this proportion may be in the range from 0 to 30% by weight, preferably 0.01 to 20% by weight and more preferably 0.1 to 10% by weight. Especially the proportion of 1-alkenes can preferably be limited to proportions of up to 30% by weight, preferably up to 20% by weight and more preferably up to 10, particularly preferred embodiments of polyalkyl(meth)acrylates for use in accordance with the invention not having any repeat units derived from 1-alkenes.

The aforementioned ethylenically unsaturated monomers can be used individually or as mixtures. It is additionally possible to vary the monomer composition during the polymerization of the main chain in order to obtain defined structures, for example block copolymers or graft polymers.

The preparation of the polyalkyl esters from the above-described compositions is known per se. For instance, these polymers can be obtained especially by free-radical polymerization, and also related processes, for example ATRP (=Atom Transfer Radical Polymerization) or RAFT (=Reversible Addition Fragmentation Chain Transfer).

The ATRP process is known per se. This reaction regime is described, for example, by J.-S. Wang, et al., J. Am. Chem. Soc., vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-described ATRP.

In addition, the inventive polymers can be obtained, for example, via RAFT methods too. This method is explained in detail, for example, in WO 98/01478 and WO 2004/083169, to which explicit reference is made for the purposes of the disclosure.

In addition, the inventive polymers are obtainable by NMP processes (nitroxide-mediated polymerization), which are described in U.S. Pat. No. 4,581,429 inter alia.

One comprehensive description, more particularly with further references, of these methods is given in K. Matyjaszewski, T. P. Davis, Handbook of Radical Polymerization, Wiley Interscience, Hoboken 2002, to which explicit reference is made for the purposes of the disclosure.

The free-radical polymerization of the ethylenically unsaturated compounds can be effected in a manner known per se. Customary free-radical polymerization is described inter alia in Ullmann's Encyclopedia of Industrial Chemistry, Sixth Edition.

In the context of the present invention, the polymerization is initiated using at least one polymerization initiator for free-radical polymerization. These include the azo initiators widely known in the specialist field, such as 2,2'-azobisisobutyronitrile, 2,2'-azobis(2,4-dimethylvaleronitrile) and 1,1-azobiscyclohexanecarbonitrile, organic peroxides such as dicumyl peroxide, diacyl peroxides such as dilauroyl peroxide, peroxydicarbonates such as diisopropyl peroxydicarbonate, peresters such as tert-butyl peroxy-2-ethylhexanoate, and the like.

Polymerization initiators of very particular suitability for the purposes of the present invention include especially the following compounds:
methyl ethyl ketone peroxide, acetylacetone peroxide, dilauroyl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis (4-tert-butylcyclohexyl) peroxydicarbonate, 2,2'-azobisisobutyronitrile, 2,2'-azobis(2,4-dimethylvaleronitrile), 1,1-azobiscyclohexanecarbonitrile, diisopropyl peroxydicarbonate, tert-amyl peroxypivalate, di(2,4-dichlorobenzoyl) peroxide, tert-butyl peroxypivalate, 2,2'-azobis(2-amidinopropane) dihydrochloride, di(3,5,5-trimethylhexanoyl) peroxide, dioctanoyl peroxide, didecanoyl peroxide, 2,2'-azobis(N,N'-dimethyleneisobutyramidine), di(2-methylbenzoyl) peroxide, dimethyl 2,2'-azobisisobutyrate, 2,2'-azobis(2-methylbutyronitrile), 2,5-dimethyl-2,5-di(2-ethylhexanoylperoxy)hexane, 4,4'-azobis(cyanopentanoic acid), di(4-methylbenzoyl) peroxide, dibenzoyl peroxide, tert-amyl peroxy-2-ethylhexanoate, tert-butyl peroxy-2-ethylhexanoate, tert-butyl peroxyisobutyrate and mixtures of the aforementioned polymerization initiators.

According to the invention, very particular preference is given to polymerization initiators having a half-life of 1 hour at a temperature in the range from 25° C. to 200° C., preferably in the range from 50° C. to 150° C., especially in the range from 50° C. to 100° C. In addition, peroxidic polymerization initiators, especially tert-butyl peroctoate, are very particularly suitable for the present purposes.

According to the embodiment, it is also possible to use various polymerization initiators. If various initiator species are used, they are preferably added separately in successive steps, in which case the polymerization initiator added later should appropriately have a higher half-life than the polymerization initiator added beforehand.

In preferred processes, the at least one polymerization initiator for the free-radical polymerization is added in at least two steps. The polymerization initiator can be added in each step in undiluted form or in diluted form, preferably dissolved in a solvent, especially in the form of a 10% by weight to 50% by weight solution in at least one mineral oil and/or a polyalphaolefin.

In a first embodiment of this preferred process, the polymerization initiator can preferably be added all at once in the first step. However, it has also been found to be very particularly appropriate to meter in the polymerization initiator in the first step, preferably continuously, especially with a constant metering rate.

In the second step, the polymerization initiator, in a first embodiment of this preferred process, is preferably added all at once. Alternatively, however, it is also preferable to meter in the polymerization initiator in the second step, preferably continuously, especially with a constant metering rate. In a very particularly preferred embodiment of this process, the polymerization initiator can be metered in continuously in the first and in the second step, favorably with a constant metering rate in each case, the mean metering rate of the second step preferably being greater than the mean metering rate of the first step. The ratio of the mean metering rate of the second step to the mean metering rate of the first step is preferably greater than 1.2:1, preferably in the range from 1.2:1 to 10:1, more preferably greater than 1.5:1, even more preferably greater than 2:1, especially greater than 3:1.

The amount of polymerization initiator added in the second step is preferably greater than the amount added in the first step, in which case, in the second step, based on the total weight of the polymerization initiator added in the first step, preferably at least 120%, appropriately 120% to 1000%, more preferably at least 150% and especially 150% to 500% of the amount of polymerization initiator added in the first step is added.

The second step is preferably commenced at a time at which 0.01 to 50.0%, appropriately 10.0 to 40.0% and especially 15.0 to 35.0% by weight of the total amount of the polymerization initiator added during the first step is yet to be consumed.

For the purposes of the present invention, it has been found to be very particularly appropriate to add the polymerization initiator in at least three steps, in which case, in the third step, more initiator is added than in the first step and than in the second step. In the third step, the polymerization initiator is appropriately added all at once. Alternatively, it is also preferable to meter in the polymerization initiator in the third step, preferably continuously, especially with a constant metering rate. In a very particularly preferred embodiment of the present invention, the polymerization initiator is metered in continuously in the first, in the second and in the third step, favorably with a constant metering rate in each case, the mean metering rate of the third step preferably being greater than the mean metering rate of the second step, and the mean metering rate of the second step preferably being greater than the mean metering rate of the first step. The ratio of the mean metering rate of the third step to the mean metering rate of the second step is preferably greater than 1.2:1, preferably in the range from 1.2:1 to 10:1, more preferably greater than 1.5:1, even more preferably greater than 2:1, especially greater than 3:1.

More preferably, the amount of polymerization initiator added in the third step is preferably greater than the amount added in the second step, in which case, in the third step, based on the total weight of the polymerization initiator added in the second step, preferably at least 120%, appropriately 120% to 1000%, more preferably at least 150% and especially 150% to 500% of the amount of polymerization initiator added in the second step is added.

The third step is preferably commenced at a time at which 0.01 to 50.0%, appropriately 10.0 to 40.0% and especially 15.0 to 35.0% by weight of the total amount of the polymerization initiator added during the second step is yet to be consumed.

This proportion of as yet unconsumed polymerization initiator can be determined in a manner known per se or calculated on the basis of the parameters known per se, for example the decomposition constant of the polymerization initiator, the temperature profile during the polymerization, the addition profile. For metered addition at constant rate at a constant temperature, for example, the following equation applies as an approximation:

$$I_{ss}/I_\Sigma = 1/(k_d t_\Sigma)$$

where the ratio $I_{ss}/I_\Sigma$ denotes the proportion of the as yet unconsumed polymerization initiator based on the total amount of the polymerization initiator added during the second step, where $k_d$ is the decomposition constant of the polymerization initiator and where $t_\Sigma$ is the duration of metered addition.

In a particularly preferred embodiment, the polymerization initiator can be added in more than three steps, in which case, from the fourth step, in each subsequent step, more polymerization initiator is added than in the immediately preceding step and the polymerization initiator is added all at once or metered in continuously, preferably at constant metering rate.

For preparation of the polymers for use in accordance with the invention, it has been found to be very particularly favorable to meter in the polymerization initiator with a constantly rising metering rate. This corresponds to an addition of constantly rising amounts of polymerization initiator in an infinite number of steps.

The process detailed above allows a rapid and extremely effective polymerization of ethylenically unsaturated compounds and leads to polymers with comparably low residual monomer contents. Nevertheless, it has occasionally been found to be extremely favorable to provide further initiation toward the end of the reaction in order to lower the residual monomer content of the reaction mixture still further. Further initiation is preferably provided at a time at which at least 75.0% by weight, appropriately at least 90.0% by weight and especially at least 95.0% by weight of the total amount of the polymerization initiator added during the last step has been consumed. Preference is given to metering in a further 0.1% by weight to 100.0% by weight, especially 5.0% by weight to 50.0% by weight, of polymerization initiator, based on the total amount of polymerization initiator added beforehand.

The total amount of initiator is preferably in the range from 0.5 to 1% and more preferably in the range from 0.6 to 0.8% by weight, based on the weight of the monomers.

The process can be performed either in the presence or in the absence of a chain transferer. The chain transferers used may be typical species described for free-radical polymerizations, as known to those skilled in the art.

The sulfur-free molecular weight regulators include, for example, without any intention that this should impose a restriction, dimeric α-methylstyrene (2,4-diphenyl-4-methyl-1-pentene), enol ethers of aliphatic and/or cycloaliphatic aldehydes, terpenes, p-terpinene, terpinolene, 1,4-cyclohexadiene, 1,4-dihydronaphthalene, 1,4,5,8-tetrahydronaphthalene, 2,5-dihydrofuran, 2,5-dimethylfuran and/or 3,6-dihydro-2H-pyran, preference being given to dimeric α-methylstyrene.

The sulfur-containing molecular weight regulators used may preferably be mercapto compounds, dialkyl sulfides, dialkyl disulfides and/or diaryl sulfides. The following polymerization regulators are mentioned by way of example: di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-t-butyl trisulfide and dimethyl sulfoxide. Compounds used with preference as molecular weight regulators are mercapto compounds, dialkyl sulfides, dialkyl disulfides and/or diaryl sulfides. Examples of these compounds are ethyl thioglycolate, 2-ethylhexyl thioglycolate, pentaerythritol tetrathioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, thioglycolic acid, mercaptosuccinic acid, thioglycerol, thioacetic acid, thiourea and alkyl mercaptans such as n-butyl mercaptan, n-hexyl mercaptan, t-dodecyl mercaptan or n-dodecyl mercaptan. Polymerization regulators used with particular preference are mercapto alcohols and mercapto carboxylic acids. In the context of the present invention, very particular preference is given to the use of n-dodecyl mercaptan and tert-dodecyl mercaptan as chain transferers.

In a particular aspect of the present invention, it is possible to use mixtures of molecular weight regulators, preferred mixtures comprising especially sulfur-containing regulators such as the abovementioned mercaptan derivatives and sulfur-free regulators such as terpinolene, terpinene and derivatives thereof, and suitable transition metal complexes. More preferably, it is possible to use mixtures of abovementioned n-dodecyl mercaptan, tert-dodecyl mercaptan and terpinolene as chain transferers.

The molecular weight regulators are used preferably in amounts of 0.05 to 10% and especially 1 to 6% by weight and more preferably 2 to 4.5% by weight, based on the monomers used in the polymerization.

Further information can be found by the person skilled in the art in the specialist literature, especially the publications H. Rausch-Puntigam, T. Völker "*Acryl-und Methacryl-verbindungen*" [Acrylic and Methacrylic Compounds] Springer, Heidelberg, 1967; Houben-Weyl "*Methoden der organischen Chemie*" [Methods of Organic Chemistry] Vol. XIV/1, p. 66ff., Georg Thieme, Heidelberg, 1961 and Kirk-Othmer "*Encyclopedia of Chemical Technology*" Vol. 1, p. 296ff., J. Wiley, New York, 1978.

Processes of particular interest are especially those in which a majority of the monomers is initially charged and the polymerization initiators, as explained above, are added in several steps over the polymerization time. Preferably, at least 50% by weight, especially at least 60% by weight, more preferably at least 80% by weight and most preferably at least 90% by weight of the monomers can be initially charged in a reactor. Subsequently, the initiators mentioned can be added at the polymerization temperature. The regulators may either be initially charged or added with the initiator, the regulators being initially charged in preferred processes. Particular preference here is given to processes in which at least 50% by weight, especially at least 60% by weight, more preferably at least 80% by weight and most preferably at least 90% by weight of the molecular weight regulators are initially charged in a reactor.

The polymerization can be performed at standard pressure, reduced pressure or elevated pressure. The polymerization temperature is also uncritical. In general, however, it is in the range of −20°-200° C., preferably 20°-180° C. and more preferably 60°-150° C. In the case of performance of a free-radical polymerization, higher polymerization temperatures may be preferable; for instance, the polymerization temperature in the case of stepwise addition of the initiator may preferably be in the range from 20 to 180° C., more preferably 60 to 150° C. Particular preference is given here especially to processes in which the polymerization is performed at a temperature in the range from 0 to 30° C. above the initiator temperature at which the half-life of the initiator is 30 minutes.

The polymerization can be performed with or without solvent. The term "solvent" should be understood here in a broad sense. The solvents to be used include hydrocarbon solvents, for example aromatic solvents such as toluene, benzene and xylene, saturated hydrocarbons, for example cyclohexane, heptane, octane, nonane, decane, dodecane, which may also be present in branched form. These solvents can be used individually or else as a mixture. Particularly preferred solvents are mineral oils, natural oils and synthetic oils, and mixtures thereof.

In a preferred embodiment, the proportion of solvent can be kept low, preferred embodiments of the process according to the invention having the feature that, after the polymerization has ended, there is no need to remove solvent from the composition, for example by distillation, in order to obtain a useable polymer mixture. Accordingly, the proportion of solvent which is used overall is preferably in the range from 0 to 30% by weight, more preferably 0.5 to 10% by weight and most preferably in the range from 1 to 8% by weight. The solvent here may especially serve for dissolution of the initiator added over the course of the reaction.

The measures detailed above, especially the stepwise addition of the initiator to a reactor comprising relatively large amounts of the monomers, can give surprising advantages. One of these is more particularly that the reaction can be performed without any great amounts of solvents. If only a small amount of 1-alkenes is used for preparation of the polyalkyl(meth)acrylates, a distillation for removal of solvents and/or residual monomers can be dispensed with. This allows the reaction to be conducted very inexpensively. It is surprisingly possible to obtain, more particularly, very narrow molecular weight distributions with a low polydispersity index without any need to use costly processes such as ATRP. In addition, the reaction time and initiator consumption can be minimized.

The proportion of the polyalkyl(meth)acrylates for use in accordance with the invention in the lubricant is at least 30% by weight, especially 35% by weight, more preferably at least 40% by weight and most preferably at least 45% by weight, based on the total weight of the lubricant.

As well as the polyalkyl(meth)acrylate to be used obligatorily, preferred lubricants for a transmission system may comprise at least one further base oil.

The preferred base oils include especially mineral oils, synthetic oils and natural oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Accordingly, mineral oils have, depending on their origin, different proportions of aromatic, cyclic, branched and linear hydrocarbons.

An improved class of mineral oils (reduced sulfur content, reduced nitrogen content, higher viscosity index, lower pour point) results from hydrogen treatment of the mineral oils (hydroisomerization, hydrocracking, hydrotreatment, hydrofinishing). In the presence of hydrogen, this essentially reduces aromatic components and builds up naphthenic components.

Synthetic oils include organic esters, for example diesters and polyesters, polyalkylene glycols, polyethers, synthetic hydrocarbons, especially polyolefins, among which preference is given to polyalphaolefins (PAOs), silicone oils and perfluoroalkyl ethers. In addition, it is possible to use synthetic base oils originating from gas to liquid (GTL), coal to liquid (CTL) or biomass to liquid (BTL) processes. They are usually somewhat more expensive than the mineral oils, but have advantages with regard to their performance.

Natural oils are animal or vegetable oils, for example neatsfoot oils or jojoba oils.

Base oils for lubricant oil formulations are divided into groups according to API (American Petroleum Institute). Mineral oils are divided into group I (non-hydrogen-treated) and, depending on the degree of saturation, sulfur content and viscosity index, into groups II and III (both hydrogen-treated). PAOs correspond to group IV. All other base oils are encompassed in group V.

These base oils may also be used as mixtures and many are commercially available.

Particularly preferred lubricants of the present invention comprise at least one polyalphaolefin (PAO) or a group III oil having a kinematic viscosity measured at 100° C. in the range from 3.0 to 10.0 mm$^2$/s, preferably in the range from 5.5 to 9.0 mm$^2$/s and more preferably in the range from 7.5 to 8.5 mm$^2$/s (ASTM D 445). In a further embodiment, preference is given to lubricants which comprise a polyalphaolefin (PAO) or a group III oil having an at 100° C. kinematic viscosity in the range from 3.0 to 5.5 mm$^2$/s and more preferably 3.5 to 5 mm$^2$/s.

Further lubricants of particular interest are those which comprise at least one group III mineral oil. Surprising advantages can be achieved especially by lubricants which comprise at least one pour point improver and at least one group III mineral oil having a kinematic viscosity $KV_{100}$ in the range from 3 to 10 mm$^2$/s and more preferably 5.5 to 9 mm$^2$/s, measured at 100° C. according to ASTM D 445. Preference is given to using poly(alkyl)methacrylates together with a group III mineral oil as a pour point improver.

The proportion of further base oils, especially of polyalphaolefins and/or group III mineral oils, may be at least 10% by weight, more preferably at least 35% by weight and most preferably at least 45% by weight, based on the total weight of the lubricant.

As well as the aforementioned components, a lubricant oil composition may comprise further additives. These additives include DI additives (dispersants, detergents, defoamers, corrosion inhibitors, antioxidants, antiwear and extreme pressure additives, friction modifiers), pour point improvers (more preferably based on polyalkyl(meth)acrylate having 1 to 30 carbon atoms in the alcohol group), and/or dyes.

In addition, the lubricant oil compositions detailed here may, as well as the inventive polymers, also be present in mixtures with conventional VI improvers. These include especially hydrogenated styrene-diene copolymers (HSDs, U.S. Pat. No. 4,116,917, U.S. Pat. No. 3,772,196 and U.S. Pat. No. 4,788,316 to Shell Oil Company), especially based on butadiene and isoprene, and also olefin copolymers (OCPs, K. Marsden: "Literature Review of OCP Viscosity Modifiers", Lubrication Science 1 (1988), 265), especially of the poly(ethylene-co-propylene) type, which may often also be present in N/O-functional form with dispersing action, or PAMAs, which are usually present in N-functional form with advantageous booster properties as a dispersant, antiwear additive and/or friction modifier (DE 1 520 696 to Rohm and Haas, WO 2006/007934 to RohMax Additives).

Compilations of VI improvers and pour point improvers for lubricant oils, especially motor oils, are detailed, for example, in T. Mang, W. Dresel (eds.): "Lubricants and Lubrication", Wiley-VCH, Weinheim 2001; R. M. Mortier, S. T. Orszulik (eds.): "Chemistry and Technology of Lubricants", Blackie Academic & Professional, London 1992; or J. Bartz: "Additive für Schmierstoffe" [Additives for Lubricants], Expert-Verlag, Renningen-Malmsheim 1994. Appropriate dispersants include poly(isobutylene) derivatives, e.g. poly(isobutylene)succinimides (PIBSIs); ethylene-propylene oligomers with N/0 functionalities.

The preferred detergents include metal-containing compounds, for example phenoxides; salicylates; thiophosphonates, especially thiopyrophosphonates, thiophosphonates and phosphonates; sulfonates and carbonates. As metals, these compounds may comprise especially calcium, magnesium and barium. These compounds may be used preferably in neutral or overbased form.

Of particular interest are additionally defoamers, which are in many cases divided into silicone-containing and silicone-free defoamers. The silicone-containing antifoams include linear poly(dimethylsiloxane) and cyclic poly(dimethylsiloxane). The silicone-free defoamers which may be used are in many cases polyethers, for example poly(ethylene glycol), polyacrylates or tributyl phosphate.

In a particular configuration, the inventive lubricant oil compositions may comprise corrosion inhibitors. These are in many cases divided into antirust additives and metal passivators/deactivators. The antirust additives used may, inter alia, be sulfonates, for example petroleumsulfonates or (in many cases overbased) synthetic alkylbenzenesulfonates, e.g. dinonylnaphthenesulfonate; carboxylic acid derivatives, for example lanolin (wool fat), oxidized paraffins, zinc naphthenates, alkylated succinic acids, 4-nonylphenoxyacetic acid, amides and imides (N-acylsarcosine, imidazoline derivatives); amine-neutralized mono- and dialkyl phosphates; morpholine; dicyclohexylamine or diethanolamine. The metal passivators/deactivators include benzotriazole, tolyltriazole, 2-mercaptobenzothiazole, dialkyl-2,5-dimercapto-1,3,4-thiadiazole; N,N'-disalicylideneethylenediamine, N,N'-disalicyli-denepropylenediamine; zinc dialkyldithiophosphates and dialkyl dithiocarbamates.

A further preferred group of additives is that of antioxidants. The antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, e.g. zinc dithiophosphates (ZnDTPs), "OOS triesters"=reaction products of dithiophosphoric acid with activated double bonds from olefins, cyclopentadiene, norbornadiene, □-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc and methylenebis(dialkyl dithiocarbamate); organophosphorus compounds, for example triaryl and trialkyl phosphites; organocopper compounds and overbased calcium- and magnesium-based phenoxides and salicylates.

The preferred antiwear (AW) and extreme pressure (EP) additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds containing sulfur and phosphorus, for example metal dithiophosphates, e.g. zinc $C_{3-12}$dialkyldithiophosphates (ZnDTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbornadiene, □-pinene, polybutene, acrylic esters, maleic esters, triphenylphosphorothionate (TPPT); compounds containing sulfur and nitrogen, for example zinc bis(amyl dithiocarbamate) or methylenebis(di-n-butyl dithiocarbamate); sulfur compounds containing elemental sulfur and $H_2S$-sulfurized hydrocarbons (diisobutylene, terpene); sulfurized glycerides and fatty acid esters; overbased sulfonates; chlorine compounds or solids such as graphite or molybdenum disulfide.

A further preferred group of additives is that of friction modifiers. The friction modifiers used may include mechanically active compounds, for example molybdenum disulfide, graphite (including fluorinated graphite), poly(trifluoroethylene), polyamide, polyimide; compounds which form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds which form polymer-like layers, for example ethoxylated dicarboxylic acid partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and their combinations with ZnDTPs, copper-containing organic compounds.

Some of the compounds detailed above may fulfill multiple functions. ZnDTP, for example, is primarily an anti-wear additive and extreme pressure additive, but also has the character of an antioxidant and corrosion inhibitor (here: metal passivator/deactivator).

The additives detailed above are described in more detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

In addition to high compatibility with further additives, the inventive polymers and the lubricants are notable for a multitude of favorable properties. Therefore, it is surprisingly possible to provide lubricants which preferably feature a low proportion of ester oils. Particularly preferred lubricants comprise at most 10% by weight and especially at most 5% by weight of ester oils. Most preferably, the inventive lubricants may not comprise any detectable amounts of ester oils. Ester oils are known in the specialist field and feature a molecular weight of at most 800 g/mol.

Preferred lubricants have a viscosity measured according to ASTM D 445 at 40° C. in the range from 200 to 2000 $mm^2/s$, especially 250 to 1000 $mm^2/s$, more preferably in the range from 300 to 800 $mm^2/s$. The kinematic viscosity $KV_{100}$ measured at 100° C. according to ASTM D 445 is preferably at least 30 $mm^2/s$, more preferably at least 35 $mm^2/s$ and most preferably at least 37 $mm^2/s$. Accordingly, preferred lubricants correspond to ISO viscosity grades (ISO VG) ISO 220, ISO 320, ISO 460, ISO 680 and ISO 1000.

The use of the inventive polymers, however, is not limited to the preferred lubricants detailed above; instead, they may also find use in other applications, especially other lubricants.

In a particular aspect of the present invention, preferred lubricant oil composition have a viscosity index determined according to ASTM D 2270 in the range from 100 to 400, more preferably in the range from 130 to 350 and most preferably in the range from 160 to 275.

The present lubricant oils have a very high shear stability, and one way of determining this is by the tapered roller bearing (KRL) test to CEC L45-T-93. For instance, preferred lubricants after 20 hours at load 5000N, an oil temperature of 60° C. and a speed of $1475/min^{-1}$ exhibit a decrease in viscosity of at most 8%.

In an appropriate modification, the permanent shear stability index (PSSI) according to ASTM D2603 Ref. B (ultrasound treatment for 12.5 minutes) may be less than or equal to 35, more preferably less than or equal to 20. It is advantageously also possible to obtain lubricant oil compositions which have a permanent shear stability index (PSSI) according to DIN 51381 (30 cycles of a Bosch pump) of at most 5, preferably at most 2 and most preferably at most 1.

Also surprisingly high is the seal compatibility of the present lubricants. For instance, the change in volume is preferably at most 0 to +10%, measured after 168 h and 1000 h at a temperature of 100° C. with an SRE NBR 28/SX elastomer according to DIN ISO 1817. In the case of use of a 72 NBR 902 or 75 FKM 585 elastomer, a change in the specimen volume of at most −2 to +5% is preferably found, measured after 168 h and 1000 h at a temperature of 100° C. according to DIN ISO 1817. In the case of use of a 75 FKM 170055 elastomer, a change in the specimen volume of at most −2 to +5% is preferably likewise found, measured after 168 h and 1000 h at a temperature of 130° C. according to DIN ISO 1817.

The change in the Shore hardness in the case of use of the inventive lubricant is preferably likewise very small. The change in the Shore A hardness is preferably between −10 and +5 Shore A points, measured after 168 h and 1000 h at a temperature of 100° C. with an SRE NBR 28/SX elastomer according to DIN ISO 1817. In the case of use of a 72 NBR 902 or 75 FKM 585 elastomer, a change in the Shore A hardness of less than or equal to ±5 Shore A points is preferably found, measured after 168 h and 1000 h at a temperature of 100° C. according to DIN ISO 1817. In the case of use of a 75 FKM 170055 elastomer, a change in the Shore A hardness of less than or equal to ±5 Shore A points is preferably likewise found, measured after 168 h and 1000 h at a temperature of 130° C. according to DIN ISO 1817.

In addition, the elastomers, after contact with the inventive lubricant, preferably have relatively constant stress-strain characteristics. For instance, the tensile strength measured according to DIN 53504 after contact with the lubricant at 100° C. for 168 h and 1000 h (DIN ISO 1817) preferably decreases by at most 30%, this value applying especially to the elastomer SRE NBR 28/SX. In the case of use of a 72 NBR 902 or 75 FKM 585 elastomer, the tensile strength measured according to DIN 53504 after contact with the lubricant at 100° C. for 168 h and 1000 h (DIN ISO 1817) preferably decreases by at most 50%. In the case of use of a 75 FKM 170055 elastomer, the tensile strength measured according to DIN 53504 after contact with the lubricant at 130° C. for 168 h and 1000 h (DIN ISO 1817) preferably likewise decreases by at most 50%.

In addition, the tensile strain at break measured according to DIN 53504 after contact with the lubricant at 100° C. for 168 h and 1000 h (DIN ISO 1817) preferably decreases by at most 40%, this value applying especially to the elastomer SRE NBR 28/SX. In the case of use of a 72 NBR 902 or 75 FKM 585 elastomer, the tensile strain at break measured according to DIN 53504 after contact with the lubricant at 100° C. for 168 h and 1000 h (DIN ISO 1817) preferably decreases by at most 60%. In the case of use of a 75 FKM 170055 elastomer, the tensile strength measured according to DIN 53504 after contact with the lubricant at 130° C. for 168 h and 1000 h (DIN ISO 1817) preferably likewise decreases by at most 60%.

In addition, the present lubricants exhibit excellent flowabilities at low temperatures. For example, the viscosity measured at −26° C. according to ASTM D2983 may preferably be at most 150 000 mPas, preferably at most 100 000 mPas and more preferably at most 70 000 mPas.

In addition, the pour point (PP) according to ASTM D97 of preferred lubricants may assume values of less than or equal to −30° C., preferably less than or equal to −35° C. and more preferably less than or equal to −45° C.

The present lubricants counteract material fatigue and wear surprisingly strongly, and so the lifetime of transmission systems can be increased. This finding can be confirmed by various methods.

For instance, especially SRV tests exhibit a surprisingly low wear factor measured according to DIN 51834-4 (load: 300N, stroke length: 1200 μm, frequency: 50 Hz, duration: 3 h). For instance, preferred lubricants at a temperature of 60° C. achieve a wear factor of preferably at most 1200 $mm^3/10^6$, especially at most 1100 $mm^3/10^6$ and more preferably 1000 $mm^3/10^6$. At 110° C., preferred lubricants attain a wear factor of preferably at most 650 $mm^3/10^6$, especially at most 550 and more preferably 500 $mm^3/10^6$.

In addition, the present lubricants have surprising advantages according to micropitting tests described in US 2009-0093384 A1, filed Oct. 3, 2007 at the US Patent Office (USPTO) with application Ser. No. 11/866,696. Preferred lubricants do not exhibit any failure with regard to micropitting at a load stage of at least 8, especially at least 9 and more preferably at least 10, measured by the method detailed in FVA Information Sheet "Micropitting", No. 54/I-IV, published by the Forschungsvereinigung Antriebstechnik e.V., Lyoner Strasse 18, D-60528 Frankfurt/Main.

The present lubricants can be used especially as transmission oil. In this context, the lubricants are especially suitable for transmission systems which are used in wind power plants, axial transmission systems and vehicle transmission systems, especially marine transmission systems. Transmission systems for wind power plants may preferably comprise spur gear and/or planetary transmission systems, preference being given especially to spur gear transmission systems with 2 to 3 spur gear stages, planetary transmission systems with 1 planetary stage and 2 spur gear transmission systems, and planetary transmission systems with 2 planetary stages and 1 spur gear transmission system, in order to transmit the high forces which bear on the transmission systems. These wind power plants may preferably have a power of at least 50 kW, especially at least 300 kW and most preferably at least 2300 kW, and the rotor torque may preferably be at least 8000 Nm, especially at least 100 000 Nm and more preferably at least 1 300 000 Nm.

The present invention is to be illustrated hereinafter by examples and comparative examples, without any intention that this should impose a restriction.

EXAMPLES AND COMPARATIVE EXAMPLES

General Method for Preparation of the Polymers

A 1 liter 4-neck round-bottom flask equipped with a precision glass stirrer (in saber form) and precision glass stirrer sleeve (operated at 150 revolutions per minute), thermometer and reflux condenser was initially charged with 760.0 g of a monomer mixture whose composition is shown in table 1, for example consisting of C12-C15-alkyl methacrylates for example 2, together with 14.06 g of dodecyl mercaptan and 14.06 g of tert-dodecyl mercaptan and 32.4 g of the mineral oil Nexbase 3020 as a solvent. The temperature was adjusted to 110° C. Thereafter, 1.9 g of tert-butyl per-2-ethylhexanoate dissolved in 7.60 g of Nexbase 3020 (20% solution) were metered in within three hours, with addition of 5% of the amount specified within the first hour, 25% within the second hour and 70% within the third hour. 120 minutes and 180 minutes thereafter, another 1.52 g each time of tert-butyl per-2-ethylhexanoate are added. The total reaction time is 6 hours.

The weight-average molecular weight $M_w$ and the polydispersity index PDI of the polymers were determined by GPC. The measurements were effected in tetrahydrofuran at 35° C. against a polymethylmethacrylate calibration curve from a set of standards (Polymer Standards Service or Polymer Laboratories), the $M_{peak}$ of which had a homogeneous logarithmic distribution over the range from $5 \cdot 10^6$ to $2 \cdot 10^2$ g/mol. A combination of six columns (Polymer Standards Service SDV 100 Å/2×SDV LXL/2×SDV 100 Å/Shodex KF-800D) was used. To record the signal, an RI detector (Agilent 1100 Series) was used.

TABLE 1

Properties of the polymers used

| Polymer | Monomer composition (weight ratio) | Mw [g/mol] | PDI (Mw/Mn) |
|---|---|---|---|
| Example 1 | LIMA 100 | 13400 | 1.66 |
| Example 2 | LIMA - LMA 20 - 80 | 14400 | 1.68 |
| Example 3 | LIMA - LMA 40 - 60 | 14200 | 1.68 |
| Example 4 | IDMA - LMA 20 - 80 | 14500 | 1.70 |
| Example 5 | $iC_{13}MA$ - LMA 20 - 80 | 14300 | 1.69 |
| Example 6 | IDMA - $C_{13}$-$C_{15}$MA 20 - 80 | 13700 | 1.68 |

LMA: alkyl methacrylate having 12 to 14 carbon atoms in the alkyl radical, the alkyl radical being a mixture comprising predominantly linear radicals (proportion of linear radicals approx. 98% by weight; proportion of $C_{12}$ approx. 73% by weight; proportion of $C_{14}$ approx. 25% by weight)
IDMA: alkyl methacrylate having about 10 carbon atoms in the alkyl radical, the alkyl radical being a mixture comprising predominantly branched radicals (proportion of branched radicals approx. 98% by weight; proportion of $C_{10}$ approx. 89.9% by weight; proportion of $C_{11}$ approx. 4.6% by weight)
LIMA: alkyl methacrylate having 12 to 15 carbon atoms in the alkyl radical, the alkyl radical being a mixture comprising branched and linear radicals (proportion of $C_{12}$ branched: approx. 12% by weight and $C_{12}$ linear: approx. 11.3% by weight; proportion of $C_{13}$ branched: approx. 17.3% by weight and $C_{13}$ linear: approx. 13.5% by weight; proportion of $C_{14}$ branched: approx. 15.7% by weight and $C_{14}$ linear: approx. 11.9% by weight; proportion of $C_{15}$ branched: approx. 9.8% by weight and $C_{15}$ linear: approx. 6.2% by weight; proportion of methyl branching approx. 14%, proportion of ethyl branching approx. 10%, proportion of propyl branching approx. 10%, proportion of longer-chain branching, especially butyl and higher, approx. 17%, based on the sum of linear and branched radicals)
$iC_{13}MA$ alkyl methacrylate having about 13 carbon atoms in the alkyl radical, the alkyl radical being predominantly branched (proportion of $C_{13}$ branched: approx. 99% by weight)
$C_{13}$-$C_{15}MA$ alkyl methacrylate having 13 to 15 carbon atoms in the alkyl radical, the alkyl radical being a mixture comprising branched and linear radicals (proportion of $C_{13}$ branched: approx. 35.6% by weight and $C_{13}$ linear: approx. 30.7% by weight; proportion of $C_{15}$ branched: approx. 16.9% by weight and $C_{15}$ linear: approx. 13.9% by weight)

The proportions of linear and branched radicals were determined by means of GC and $^{13}C$ and $^1H$ NMR. The $^{13}C$ spectra were conducted at 30° C. using standard pulse sequences for quantitative determination of $^{13}C$ signals, more particularly with selection of a relaxation time of 10s and use of broadband decoupling to suppress nuclear Overhauser effects. To improve the signal-noise ratio (S/N ratio), at least 1000 scans were conducted.

The $^{13}C$ NMR data obtained were processed by mathematical methods in order to optimize the S/N ratio (line broadening of 3 Hz). The $^{13}C$ NMR signals were assigned by 2D NMR experiments, taking into account the influences of the incremental chemical shifts of the $^{13}C$ signals. The integrals of the following $^{13}C$ signal areas were used to calculate the isomer distribution:

| Substructure | Chemical shift of the $^{13}C$ signal |
|---|---|
| unbranched n-alkanol | 62.93 ppm (C1) |
| 2-methyl-1-alkanol | 69.30 ppm (C1), 16.68 ppm (C1, side chain) |

-continued

| Substructure | Chemical shift of the $^{13}C$ signal |
|---|---|
| 2-ethyl-1-alkanol | 65.23 ppm (C1), 42.12 ppm (C2) |
| 2-propyl-1-alkanol | 20.10 ppm (C2, side chain), 40.43 ppm (C2) |
| 2-butyl+*-1-alkanol | 65.61 ppm (C1) includes 2-propyl (C1), 40.64 ppm (C2) |
| *butyl and >C4 chains | |

The signal areas were normalized to 100% in order to obtain the isomer distribution of the alcohols in percent.

The results were checked by means of $^1H$ NMR:

| Substructure | Chemical shift of the $^1H$ signal |
|---|---|
| unbranched n-alkanol | 3.61 ppm (2H, t) |
| 2-methyl-1-alkanol | 3.37 ppm (1H, B component of the ABX system) |
| all other branched alkanols | 3.50 ppm (2H, d) |

In addition, the degree of branching was checked via by evaluation of the signal areas of the □-methyl groups (0.88 ppm) and of the □-$CH_2$ groups (3.3-3.7 ppm).

Application Studies

The properties of the polymers obtained were tested using lubricant compositions which comprised 2.65% by weight of additive (Hitec® 307) and a polyalphaolefin (PAO 8). The amounts of PAO and of polymer added up to 97.35% by weight. Table 1 reports only the proportion of polymer, and the lubricants were adjusted to a kinematic viscosity of 320 $mm^2/s$ at 40° C. ($KV_{40}$). The kinematic viscosities $KV_{40}$ and $KV_{100}$ measured at 40° C. and 100° C. respectively were determined according to ASTM D 445. The viscosity index VI was found according to ASTM D 2270. The pour point was measured according to ASTM D97. The low-temperature flowability at −26° C. was determined according to ASTM D2983 (Brookfield; BF). The results obtained are shown in table 2. The Brookfield viscosity was determined by two measurements, and the arithmetic mean is reported.

TABLE 2

| Application | Amount of polymer [% by wt.] | $KV_{40}$ [$mm^2/s$] | $KV_{100}$ [$mm^2/s$] | VI | Pour point [° C.] | BF −26° C. [mPas] |
|---|---|---|---|---|---|---|
| 1 | Example 1 48.1 | 321.1 | 36.90 | 163 | −39 | 62000 |
| 2 | Example 2 48.2 | 319.1 | 37.08 | 165 | −33 | 62000 |
| 3 | Example 3 48.2 | 316.2 | 36.87 | 165 | −36 | 57500 |
| 4 | Example 4 46.0 | 319.4 | 36.38 | 162 | −39 | 67000 |
| 5 | Example 5 47.1 | 320.7 | 36.53 | 162 | −39 | 65000 |
| 6 | Example 6 46.2 | 321.0 | 36.06 | 159 | −42 | 70000 |

In addition, tests were conducted to show the influence of the second base oil. For this purpose, various lubricants were produced, the composition and properties of which are described in table 3. The test methods were detailed above, and all proportions are based on % by weight.

TABLE 3

| Lubricant | 7 | 8 | 9 | 10 |
|---|---|---|---|---|
| Constituents | | | | |
| Polymer according to Example 1 | 61.0 | 51.0 | | |
| Polymer according to Example 2 | | | 57.0 | 47.0 |
| Hitec 307 | 2.65 | 2.65 | 2.65 | 2.65 |
| PAO 4 | 36.35 | | 40.35 | |
| PAO 8 | | 46.35 | | 50.35 |
| Test results | | | | |
| $KV_{40}$ [° C.] | 318.2 | 315.4 | 316.3 | 323.9 |
| $KV_{100}$ [° C.] | 38.44 | 36.78 | 37.45 | 36.27 |
| VI | 172 | 165 | 168 | 159 |
| Pour point [° C.] | −45 | −45 | −33 | −39 |
| BF −26° C. [mPas] | 60000 | 62000 | 57000 | 71000 |

To study seal compatibility, the lubricant composition detailed in application 8 comprising about 51% by weight of polymer according to example 1 and 46.35% by weight of PAO 8 was used. The test data were obtained according to DIN 53521 and DIN 53505. The data obtained are shown in table 4.

TABLE 4

Seal compatibility of the lubricant detailed in application 8

| Time [h] | Temp. [° C.] | Elastomer | Tensile strength [%] | Strain [%] | Hardness [Shore A points] | Change in volume [%] |
|---|---|---|---|---|---|---|
| 168 | 100 | SRE NBR 28/SX | −3.6 | −21 | −2 | +3.6 |
| 168 | 100 | 72 NBR 902 | +0.8 | +1.6 | +1 | −1.5 |
| 168 | 100 | 75 FKM 585 | −6.9 | +5.3 | 0 | +0.3 |
| 168 | 130 | 75 FKM 170055 | −12 | +5.3 | 0 | +1.5 |
| 1000 | 100 | SRE NBR 28/SX | −23 | −67 | +6 | +8.3 |
| 1000 | 100 | 72 NBR 902 | −13 | −57 | +4 | +5.8 |
| 1000 | 100 | 75 FKM 585 | −10 | −0.9 | 0 | +0.7 |
| 1000 | 130 | 75 FKM 170055 | −13 | +3.2 | 0 | +3.3 |

In addition, the improvement in wear through an inventive composition was studied. For this purpose, a lubricant comprising about 51.2% by weight of polymer according to example 1, 2.65% by weight of Hitec 307 and 46.15% by weight of PAO 8 was produced and subjected to an SVR test according to DIN 51834-4. In the case of a measurement at 60° C., the lubricant had a wear factor of 987 at a wear diameter of 608 μm (60° C., 300N, 1200μ, 50 Hz, 3 h). In the case of a measurement at 110° C., the wear factor was 472 at a wear diameter of 655 μm (110° C., 300N, 1200μ, 50 Hz, 3 h). The coefficient of friction was 0.072.

In addition, a test of formation of gray staining was conducted with an instrument from PCS Instruments (PCS Micropitting rig). This involved operating three rollers against one another with different loads using a lubricant. The speed on the contact surfaces is approx. 3.5 m/s, and three load stages are typically selected. For instance, the rollers are run first at 1.1 GPa for one hour, then at 1.4 GPa for one hour and finally at 1.7 GPa for two hours. The roller wear caused by the load is determined after each stage. The test was conducted at 60° C. and 90° C. with the lubricant detailed above in application 4 (46.0 by weight of polymer according to Example 4, 51.35 PAO 8). The comparative example selected was a customary formulation composed of different PAOs which are used in wind power plants.

TABLE 5

Results of the micropitting test

| | Time [h] | | |
|---|---|---|---|
| | 1 | 2 | 4 |
| Weight loss of the rollers [mg] at 90° C. | | | |
| Comparative lubricant 1 | 0.5 | 5.7 | 6 |
| Lubricant according to application 4 | 0.6 | 1.1 | 2.1 |
| Weight loss of the rollers [mg] at 60° C. | | | |
| Comparative lubricant 1 | 0.2 | 1.4 | 1.4 |
| Lubricant according to application 4 | 0.1 | 0.2 | 0.6 |

The invention claimed is:

1. A lubricant, comprising at least 30% by weight of a polyalkyl(meth)acrylate, wherein the polyalkyl(meth)acrylate comprises:
   a) 0 to 0.5% by weight of repeat units derived from (meth)acrylates of the formula (I):

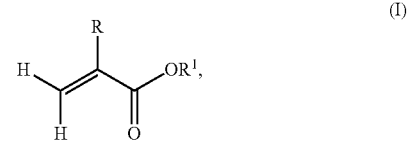

(I)

wherein R is hydrogen or methyl, and $R^1$ is an alkyl radical having 1 to 5 carbon atoms;
   b) 50 to 100% by weight of repeat units derived from (meth)acrylates of the formula (II):

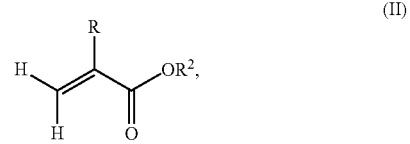

(II)

wherein R is hydrogen or methyl, and $R^2$ is an alkyl radical having 6 to 15 carbon atoms; and
   c) 0 to 50% by weight of repeat units derived from (meth)acrylates of the formula (III):

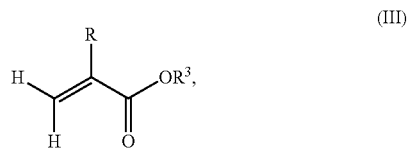

(III)

wherein R is hydrogen or methyl, and $R^3$ is an alkyl radical having 16 to 40 carbon atoms; and wherein
the polyalkyl(meth)acrylate comprises n-dodecyl thioether and t-dodecylthioether terminal groups,
the repeat units of the formula (II) comprise a mixture of linear and branched radicals such that 5 to 80% of the $R^2$ radicals are branched, based on the weight of the repeat units of the formula (II),
the polyalkyl(meth)acrylate is obtained by copolymerization of the component monomers in the presence of 2 to 6% by weight relative to a total weight of the component monomers of a combination of n-dodecyl-mercaptan and t-dodecyl mercaptan, and
a weight average molecular weight of the polyalkyl(meth)acrylate is from 3000 to 25,000 g/mol and a polydispersity of the polyalkyl(meth)acrylate is from 1.1 to 2.5.

2. The lubricant of claim 1, further comprising a polyalphaolefin (PAO) having a kinematic viscosity $KV_{100}$ in the range from 3 to mm²/s, measured at 100° C. according to ASTM D 445.

3. The lubricant of claim 1, further comprising a pour point improver and a group III mineral oil having a kinematic viscosity $KV_{100}$ in the range from 3 to 10 mm²/s, measured at 100° C. according to ASTM D 445.

4. The lubricant of claim 1, wherein a weight-average molecular weight of the polyalkyl(meth)acrylate is from 10,000 to 18,000 g/mol.

5. The lubricant of claim 1, wherein a kinematic viscosity $KV_{100}$ of the lubricant is at least 30 mm²/s, measured at 100° C. according to ASTM D 445.

6. The lubricant of claim 1, wherein a proportion of repeat units derived from (meth)acrylates of the formula (II) is at least 70% by weight.

7. The lubricant of claim 1, wherein the polyalkyl(meth)acrylate further comprises repeat units derived from dispersing monomers.

8. A polyalkyl(meth)acrylate, comprising:
a) 0 to 0.5% by weight of repeat units derived from (meth)acrylates of the formula (I):

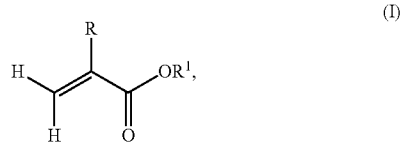

wherein R is hydrogen or methyl, and $R^1$ is an alkyl radical having 1 to 5 carbon atoms;
b) 50 to 100% by weight of repeat units derived from (meth)acrylates of the formula (II):

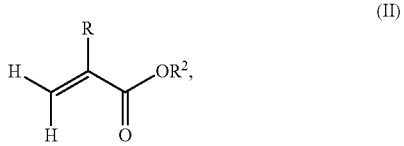

wherein R is hydrogen or methyl, and $R^2$ is an alkyl radical having 6 to 15 carbon atoms; and
c) 0 to 50% by weight of repeat units derived from (meth)acrylates of the formula (III):

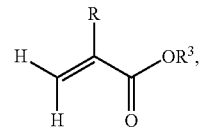

wherein R is hydrogen or methyl, and $R^3$ is an alkyl radical having 16 to 40 carbon atoms, wherein:
the polyalkyl(meth)acrylate comprises n-dodecyl thioether and t-dodecylthioether terminal groups,
the polyalkyl(meth)acrylate has a weigh-average molecular weight in the range from 3000 to 25,000 g/mol and a polydispersity in the range from 1.1 to 2.5;
the polyalkyl(meth)acrylate is obtained by copolymerization of the component monomers in the presence of 2 to 6% by weight relative to a total weight of the component monomers of a combination of n-dodecyl-mercaptan and t-dodecyl mercaptan, and
the repeat units of the formula (II) comprise a mixture of linear and branched radicals such that 5 to 80% of the $R^2$ radicals are branched, based on the weight of the repeat units of the formula (II).

9. The polyalkyl(meth)acrylate of claim 8, wherein the repeat units of the formula (II) comprise a mixture of linear and branched radicals such that 10 to 65% of the $R^2$ radicals are branched, based on the weight of the repeat units of the formula (II).

10. The polyalkyl(meth)acrylate of claim 8, wherein the weight-average molecular weight is from 5000 to 15 000 g/mol.

11. The polyalkyl(meth)acrylate of claim 8, wherein the polydispersity is from 1.4 to 1.9.

12. The polyalkyl(meth)acrylate of claim 8, wherein the repeat units of the formula (II) comprise a mixture of linear and branched radicals such that a proportion by weight of the branched $R^2$ radicals having 9 to 11 carbon atoms is higher than a proportion by weight of the linear $R^2$ radicals having 9 to 11 carbon atoms.

13. The polyalkyl(meth)acrylate of claim 8, wherein the repeat units of the formula (II) comprise a mixture of linear and branched radicals such that a proportion by weight of the linear $R^2$ radicals having 12 to 15 carbon atoms is higher than a proportion by weight of the branched $R^2$ radicals having 12 to 15 carbon atoms.

14. The polyalkyl(meth)acrylate of claim 8, wherein the repeat units of the formula (II) comprise a mixture of branched and linear radicals such that a weight ratio of branched to linear $R^2$ radicals is in the range from 60:40 to 20:80.

15. The polyalkyl(meth)acrylate of claim 8, wherein the repeat units of the formula (II) comprise a mixture of $R^2$ radicals having a different number of carbon atoms, such that a proportion by weight of $R^2$ radicals having 12 to 15 carbon atoms is greater than a proportion by weight of $R^2$ radicals having 7 to 11 carbon atoms.

16. The polyalkyl(meth)acrylate of claim 8, wherein the repeat units of the formula (II) comprise a mixture of linear and branched radicals such that at least 50% by weight of the repeat units of the formula (II) comprise a branched $R^2$ radical having a branch at the 2 position.

17. The polyalkyl(meth)acrylate of claim 8, wherein the repeat units of the formula (II) comprise a mixture of repeat units comprising methyl branches and ethyl branches.

18. The polyalkyl(meth)acrylate of claim 8, wherein the repeat units of the formula (II) comprise a mixture of repeat units comprising propyl branches and longer-chain branches.

19. A process for preparing the polyalkyl(meth)acrylate of claim 8, the process comprising polymerizing a composition comprising a (meth)acrylate of the formula (II) by a free-radical polymerization in the presence of 2 to 6% by weight relative to a total weight of the component monomers of a combination of n-dodecyl mercaptan and t-dodecyl mercaptan.

20. The process of claim 19, wherein the composition comprises 2 to 4.5% by weight of the combination of n-dodecylmercaptan and t-dodecyl mercaptan, based on the weight of monomers.

21. The process of claim 19, wherein at least 60% by weight of monomers are initially charged.

22. The process of claim 19, further comprising adding an initiator in at least two steps, such that less of the initiator is added in a first step than in subsequent steps.

23. The process of claim 19, wherein a proportion of solvent present during the polymerization is from 0.5 to 10% by weight.

24. The process of claim 19, wherein the polymerization occurs at a temperature in a range from 0 to 30° C. above an initiator temperature at which the half-life of the initiator is 30 minutes.

25. A process of lubricating a transmission system, the process comprising contacting the transmission system with the lubricant of claim 1.

26. A wind power plant, comprising a transmission system having the lubricant of claim 1.

\* \* \* \* \*